United States Patent
Zhang et al.

(10) Patent No.: US 11,540,249 B2
(45) Date of Patent: Dec. 27, 2022

(54) POSITIONING MANAGEMENT METHOD AND DEVICE, NG-RAN NODE AND CORE NETWORK NODE

(71) Applicant: DATANG MOBILE COMMUNICATIONS EQUIPMENT CO., LTD., Beijing (CN)

(72) Inventors: Dajun Zhang, Beijing (CN); Haiyang Quan, Beijing (CN); Ming Ai, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 17/262,109

(22) PCT Filed: Aug. 30, 2019

(86) PCT No.: PCT/CN2019/103630
§ 371 (c)(1),
(2) Date: Jan. 21, 2021

(87) PCT Pub. No.: WO2020/057343
PCT Pub. Date: Mar. 26, 2020

(65) Prior Publication Data
US 2021/0297982 A1    Sep. 23, 2021

(30) Foreign Application Priority Data
Sep. 18, 2018  (CN) .......................... 201811086776.4

(51) Int. Cl.
*H04W 64/00* (2009.01)
*H04W 8/24* (2009.01)
(Continued)

(52) U.S. Cl.
CPC .......... *H04W 64/006* (2013.01); *H04W 8/24* (2013.01); *H04W 24/10* (2013.01); *H04W 92/20* (2013.01)

(58) Field of Classification Search
CPC . H04W 64/00; H04W 64/003; H04W 64/006; H04W 8/24; H04W 24/10; H04W 92/20; G01S 5/0036; G01S 5/02
See application file for complete search history.

(56) References Cited

U.S. PATENT DOCUMENTS

2007/0218905 A1    9/2007  Lee
2012/0295623 A1*  11/2012  Siomina ............... H04W 64/00
                                                    455/456.2
(Continued)

FOREIGN PATENT DOCUMENTS

CN    102742335 A    10/2012
CN    108024296 A     5/2018
(Continued)

OTHER PUBLICATIONS

Extended European Search Report from EP app. No. 19863842.1, dated Oct. 29, 2021, all pages.
(Continued)

*Primary Examiner* — Siu M Lee
(74) *Attorney, Agent, or Firm* — Ladas & Parry, LLP

(57) ABSTRACT

The present disclosure provides a positioning management method, a positioning management device, an NG-RAN node and a core network node. The positioning management method includes: receiving a positioning request message from the core network node; performing positioning measurement in accordance with the positioning request message, so as to acquire a positioning measurement result; and acquiring position information about a target UE in accor-
(Continued)

dance with the positioning measurement result, and feeding the position information back to the core network node.

20 Claims, 8 Drawing Sheets

(51) Int. Cl.
*H04W 24/10* (2009.01)
*H04W 92/20* (2009.01)

(56) References Cited

U.S. PATENT DOCUMENTS

| | | | |
|---|---|---|---|
| 2018/0199160 A1* | 7/2018 | Edge | H04W 4/02 |
| 2020/0021946 A1* | 1/2020 | Kumar | G01S 1/0428 |
| 2020/0053638 A1* | 2/2020 | Edge | H04W 48/16 |
| 2020/0053690 A1* | 2/2020 | Fischer | H04W 64/003 |
| 2020/0084569 A1* | 3/2020 | Jain | H04W 4/02 |
| 2020/0092776 A1* | 3/2020 | Edge | H04W 36/08 |
| 2020/0404570 A1 | 12/2020 | Wang et al. | |
| 2021/0320769 A1* | 10/2021 | Cha | H04L 5/0053 |

FOREIGN PATENT DOCUMENTS

| | | |
|---|---|---|
| CN | 108282828 A | 7/2018 |
| WO | 2018129337 A1 | 7/2018 |

OTHER PUBLICATIONS

CATT, "Consideration on Supporting Local LMF in NR Positioning R16", R2-1816955, 3GPP TSG-RAN WG2 Meeting #104, Spokane, USA, Nov. 12-16, 2018, all pages.
3rd Generation Partnership Project; Technical Specification Group Services and System Aspects; Study on Enhancement to the 5GC LoCation Services (Release 16), 3GPP TR 23.731 V0.6.0, Aug. 2018, all pages.
First Office Action and Search Report from CN app. No. 201811086776. 4, dated Aug. 20, 2020, with English translation from Global Dossier.
International Search Report from PCT/CN2019/103630, dated Nov. 26, 2019, with English translation from WIPO.
Written Opinion of the International Searching Authority from PCT/CN2019/103630, dated Nov. 26, 2019, with English translation from WIPO.
International Preliminary Report on Patentability from PCT/CN2019/103630, dated Mar. 23, 2021, with English translation from WIPO.
"Study on enhancement to the 5GC location services", R2-1817723, 3GPP TSG-RAN WG2 #104, Spokane, USA, Nov. 12-Nov. 16, 2018.
"Discussion Paper on 5GC Location Solutions", S2-177258, SA WG2 Meeting #123, Ljubljana, Slovenia, Oct. 23-27, 2017.
Unified Solution for Location Service Exposure, S2-188596, SA WG2 Meeting #128bis, Sophia Antipolis, France, Aug. 20-24, 2018.
"Solution for Local LCS architecture", S2-1811186, SA WG2 Meeting #129, Dongguan, P.R. China, Oct. 15-19, 2018.

* cited by examiner

POSITIONING MANAGEMENT METHOD AND DEVICE, NG-RAN NODE AND CORE NETWORK NODE

CROSS-REFERENCE TO RELATED APPLICATIONS

The present application is the U.S. national phase of PCT Application No. PCT/CN2019/103630 filed on Aug. 30, 2019, which claims a priority to the Chinese patent application 201811086776.4 filed on Sep. 18, 2018, the disclosures of which are incorporated herein by reference in their entireties.

TECHNICAL FIELD

The present disclosure relates to the field of communications technology, in particular to a positioning management method, a location management device, a Next-Generation (NG)-Radio Access Network (RAN) node, and a code network node.

BACKGROUND

Location Based Service (LBS) is a service for acquiring position information about a User Equipment (UE) via a wireless communication network or any other positioning system and then providing various information related to a position to a user in combination with a Geographic Information System (GIS). A Global Navigation Satellite System (GNSS)-based outdoor positioning technology has been widely applied in various fields. Apart from this, a high-accuracy positioning technology based on a $4^{th}$-Generation (4G) mobile communication network has also effectively filled a gap of the navigation satellite system. Currently, the mobile communication network has entered a $5^{th}$-Generation (5G) era, so it is necessary to provide more concise and more efficient 5G positioning network architecture. As compared with 4G Long Term Evolution (LTE) architecture, the 5G positioning network architecture shall meet a positioning demand at higher accuracy and lower delay.

(1) 5G Mobile Communication System

In a 5G system, principally nodes at a network side are connected to each other in a wired manner, i.e., gNBs (New Radio (NR) NodeB, 5G base stations) are connected to each other via a wired link, and the gNB is connected to a core network node, e.g., Access and Mobility Management Function (AMF) or User Plane Function (UPF), also via a wired link.

Ng-eNB (a 4G base station node capable of accessing a core network 5GC) is a node providing Evolved Universal Terrestrial Radio Access (E-UTRA) user plane and control plane protocol terminations towards the UE, and connected via an NG interface to the 5GC, as shown in FIG. 1, where Xn represents an Xn interface, NG represents the NG interface, and NG-RAN represents a radio access network.

(2) 5G Radio Protocol Architecture 5G basic user plane protocol layers include a Service Discovery Application Profile (SDAP) layer, a Packet Data Convergence Protocol (PDCP) layer, a Radio Link Control (RLC) layer, a Media Access Control (MAC) layer and a physical layer (PHY). Control plane protocol layers include a Non-Access Stratum (NAS), a Radio Resource Control (RRC) layer, a PDCP layer, an RLC layer, an MAC layer and a PHY. To be specific, FIG. 2 shows protocol stack architecture at a user plane and a control plane.

(3) 5G Positioning Network Architecture

FIG. 3 shows service-based positioning service network architecture. A location Management Function (LMF) has the following functions: supporting positioning calculation, acquiring a downlink positioning measurement result or a positioning estimate from the UE, acquiring an uplink positioning measurement result from an RAN side, acquiring auxiliary data from the RAN side, etc. in FIG. 3, N1 represents an N1 interface (which may also be understood as a logic interface between the UE and the AMF), N2 represents an N2 interface, NLs represents an NLs interface, NLg represents an NLg interface, NLh represents an NLh interface, Le represents an Le interface, UDM represents a universal data management entity, GMLC represents a gateway mobile location center, LRF represents a location retrieval function, and External Client represents an external client.

In the related art, the LMF is located in the 5GC. In order to complete one positioning service, a desired information transmission procedure is shown as follows: AMF→LMF (LPP, a peer layer positioning protocol between the UE and a positioning server)→AMF (NAS)→RAN→UE, and then UE→RAN→AMF (NAS)→LMF (LPP)→AMF. Considering a transmission delay and a processing delay in this procedure, inevitably an overall delay is highly demanded in the positioning service.

SUMMARY

An object of the present disclosure is to provide a positioning management method, a positioning management device, a 5G RAN node and a core network node, so as to solve the problem in a conventional positioning management scheme where the overall delay is highly demanded in the positioning service.

In one aspect, the present disclosure provides in some embodiments a positioning management method for an NG-RAN node, including: receiving a positioning request message from a core network node; performing positioning measurement in accordance with the positioning request message, so as to acquire a positioning measurement result; and acquiring position information about a target UE in accordance with the positioning measurement result, and feeding the position information back to the core network node.

In a possible embodiment of the present disclosure, the performing the positioning measurement in accordance with the positioning request message so as to acquire the positioning measurement result includes performing the positioning measurement using a target positioning algorithm in accordance with the positioning request message, so as to acquire the positioning measurement result.

In a possible embodiment of the present disclosure, the target positioning algorithm is determined in accordance with positioning capability information about the target UE.

In a possible embodiment of the present disclosure, the performing the positioning measurement using the target positioning algorithm so as to acquire the positioning measurement result includes: transmitting a downlink positioning message to the target UE in accordance with the target positioning algorithm; and performing, by the target UE, the positioning measurement in accordance with the downlink positioning message, and feeding an uplink positioning message back to the NG-RAN node, the uplink positioning message including the positioning measurement result.

In a possible embodiment of the present disclosure, the performing, by the target UE, the positioning measurement in accordance with the downlink positioning message and feeding the uplink positioning message back to the NG-RAN node includes, when the target UE has received the downlink positioning message in an idle state, triggering, by the target UE, a service establishment procedure, performing the positioning measurement in accordance with the downlink positioning message after a service has been established successfully, and feeding the uplink positioning message back to the NG-RAN node.

In a possible embodiment of the present disclosure, the target positioning algorithm is determined in accordance with positioning capability information about the target UE, positioning capability information about the NG-RAN node, and positioning capability information about a network element adjacent to the NG-RAN node. The NG-RAN node and the network element adjacent to the NG-RAN node are both network elements participating in the positioning measurement.

In a possible embodiment of the present disclosure, the performing the positioning measurement using the target positioning algorithm so as to acquire the positioning measurement result includes: transmitting a network positioning message to the network element adjacent to the NG-RAN node in accordance with the target positioning algorithm; and performing, by the network element adjacent to the NG-RAN node, the positioning measurement in accordance with the network positioning message, and feeding the positioning measurement result back to the NG-RAN node.

In a possible embodiment of the present disclosure, the positioning management method further includes: transmitting a first interface setup request message to the core network node; and receiving a first interface setup response message fed back by the network core node in accordance with the first interface setup request message. The first interface setup request message is used to explicitly or implicitly indicate that the NG-RAN node includes a Local Location Management Function (LLMF), a first interface is an NG interface or S1 interface, the NG interface is a communication interface between an NG-RAN and a core network, and the S1 interface is a communication interface between a Long Term Evolution (LTE) eNodeB and an Evolved Packet Core (EPC).

In a possible embodiment of the present disclosure, when the first interface setup request message is used to indicate that the NG-RAN node includes the LLMF, at least one of the following conditions is met: a condition where the first interface setup request message carries local location function indication information, a condition where the first interface setup request message carries identity information about the LLMF, a condition where the first interface setup request message carries Internet Protocol (IP) address information about the LLMF, and a condition where the first interface setup request message carries positioning capability information about the LLMF.

In a possible embodiment of the present disclosure, subsequent to transmitting the first interface setup request message to the core network node, the positioning management method further includes: transmitting a predetermined configuration update message to the core network node; and receiving a predetermined configuration update acknowledgement message fed back by the core network node in accordance with the predetermined configuration update message. The predetermined configuration update message carries the positioning capability information about the LLMF, the predetermined configuration update message is an RAN configuration update message or a base station configuration update message, and the predetermined configuration update acknowledgement message is an RAN configuration update acknowledgement message or a base station configuration update acknowledgement message.

In a possible embodiment of the present disclosure, the positioning capability information about the LLMF includes at least one of a positioning algorithm capable of being supported by the LLMF, accuracy of the LLMF, a positioning response time of the LLMF, and a maximum quantity of positioning capable of being supported by the LLMF.

In another aspect, the present disclosure provides in some embodiments a positioning management method for a core network node, including: transmitting a positioning request message to an NG-RAN node; and receiving position information about a target UE fed back by the NG-RAN node in accordance with the positioning request message.

In a possible embodiment of the present disclosure, the positioning management method further includes: receiving a first interface setup request message from the NG-RAN node, the first interface setup request message explicitly or implicitly indicating that the NG-RAN node includes an LLMF; and storing related information about the LLMF carried in the first interface setup request message, and feeding a first interface setup response message back to the NG-RAN node in accordance with the first interface setup request message. A first interface is an NG interface or S1 interface, the NG interface is a communication interface between an NG-RAN and a core network, and the S1 interface is a communication interface between an LTE eNodeB and an EPC.

In a possible embodiment of the present disclosure, subsequent to feeding the first interface setup response message back to the NG-RAN node, the positioning management method further includes transmitting the related information about the LLMF to a UDM for storage.

In a possible embodiment of the present disclosure, the related information about the LLMF at least includes corresponding RAN identification information.

In a possible embodiment of the present disclosure, subsequent to receiving the first interface setup request message from the NG-RAN node, the positioning management method further includes: receiving a predetermined configuration update message from the NG-RAN node; and storing the related information about the LLMF carried in the predetermined configuration update message, and feeding a predetermined configuration update acknowledgement message back to the NG-RAN node in accordance with the predetermined configuration update message. The predetermined configuration update message is an RAN configuration update message or a base station configuration update message, and the predetermined configuration update acknowledgement message is an RAN configuration update acknowledgement message or a base station configuration update acknowledgement message.

In a possible embodiment of the present disclosure, subsequent to feeding the predetermined configuration update acknowledgement message back to the NG-RAN node, the positioning management method further includes transmitting the related information about the LLMF carried in the predetermined configuration update message to the UDM for storage.

In yet another aspect, the present disclosure provides in some embodiments an NG-RAN node, including a memory, a processor, a computer program stored in the memory and executed by the processor, and a transceiver or a network interface. The processor is configured to execute the computer program so as to: receive through the transceiver or network interface a positioning request message from a core network node; perform positioning measurement in accordance with the positioning request message, so as to acquire a positioning measurement result; and acquire position information about a target UE in accordance with the positioning measurement result, and feed the position information back to the core network node.

In a possible embodiment of the present disclosure, the processor is further configured to perform the positioning measurement using a target positioning algorithm in accordance with the positioning request message, so as to acquire the positioning measurement result.

In a possible embodiment of the present disclosure, the target positioning algorithm is determined in accordance with positioning capability information about the target UE.

In a possible embodiment of the present disclosure, the performing the positioning measurement using the target positioning algorithm so as to acquire the positioning measurement result includes: transmitting a downlink positioning message to the target UE in accordance with the target positioning algorithm; and performing, by the target UE, the positioning measurement in accordance with the downlink positioning message, and feeding an uplink positioning message back to the NG-RAN node, the uplink positioning message including the positioning measurement result.

In a possible embodiment of the present disclosure, the performing, by the target UE, the positioning measurement in accordance with the downlink positioning message and feeding the uplink positioning message back to the NG-RAN node includes, when the target UE has received the downlink positioning message in an idle state, triggering, by the target UE, a service establishment procedure, performing the positioning measurement in accordance with the downlink positioning message after a service has been established successfully, and feeding the uplink positioning message back to the NG-RAN node.

In a possible embodiment of the present disclosure, the target positioning algorithm is determined in accordance with positioning capability information about the target UE, positioning capability information about the NG-RAN node, and positioning capability information about a network element adjacent to the NG-RAN node. The NG-RAN node and the network element adjacent to the NG-RAN node are both network elements participating in the positioning measurement.

In a possible embodiment of the present disclosure, the performing the positioning measurement using the target positioning algorithm so as to acquire the positioning measurement result includes: transmitting a network positioning message to the network element adjacent to the NG-RAN node in accordance with the target positioning algorithm; and performing, by the network element adjacent to the NG-RAN node, the positioning measurement in accordance with the network positioning message, and feeding the positioning measurement result back to the NG-RAN node.

In a possible embodiment of the present disclosure, the processor is further configured to: transmit through the transceiver or network interface a first interface setup request message to the core network node; and receive a first interface setup response message fed back by the network core node in accordance with the first interface setup request message. The first interface setup request message is used to explicitly or implicitly indicate that the NG-RAN node includes an LLMF, a first interface is an NG interface or S1 interface, the NG interface is a communication interface between an NG-RAN and a core network, and the S1 interface is a communication interface between an LTE eNodeB and an EPC.

In a possible embodiment of the present disclosure, when the first interface setup request message is used to indicate that the NG-RAN node includes the LLMF, at least one of the following conditions is met: a condition where the first interface setup request message carries local location function indication information, a condition where the first interface setup request message carries identity information about the LLMF, a condition where the first interface setup request message carries IP address information about the LLMF, and a condition where the first interface setup request message carries positioning capability information about the LLMF.

In a possible embodiment of the present disclosure, the processor is further configured to, subsequent to transmit the first interface setup request message to the core network node, transmit through the transceiver or network interface a predetermined configuration update message to the core network node; and receive a predetermined configuration update acknowledgement message fed back by the core network node in accordance with the predetermined configuration update message. The predetermined configuration update message carries the positioning capability information about the LLMF, the predetermined configuration update message is an RAN configuration update message or a base station configuration update message, and the predetermined configuration update acknowledgement message is an RAN configuration update acknowledgement message or a base station configuration update acknowledgement message.

In a possible embodiment of the present disclosure, the positioning capability information about the LLMF includes at least one of a positioning algorithm capable of being supported by the LLMF, accuracy of the LLMF, a positioning response time of the LLMF, and a maximum quantity of positioning capable of being supported by the LLMF.

In still yet another aspect, the present disclosure provides in some embodiments a core network node, including a memory, a processor, a computer program stored in the memory and executed by the processor, and a transceiver or network interface. The processor is configured to execute the computer program so as to: transmit through the transceiver or network interface a positioning request message to an NG-RAN node; and receive position information about a target UE fed back by the NG-RAN node in accordance with the positioning request message.

In a possible embodiment of the present disclosure, the processor is further configured to: receive through the transceiver or network interface a first interface setup request message from the NG-RAN node, the first interface setup request message explicitly or implicitly indicating that the NG-RAN node includes an LLMF; and store related information about the LLMF carried in the first interface setup request message, and feed a first interface setup response message back to the NG-RAN node in accordance with the first interface setup request message. A first interface is an NG interface or S1 interface, the NG interface is a communication interface between an NG-RAN and a core network, and the S1 interface is a communication interface between an LTE eNodeB and an EPC.

In a possible embodiment of the present disclosure, the processor is further configured to, subsequent to feeding the first interface setup response message back to the NG-RAN node, transmit through the transceiver or network interface the related information about the LLMF to a UDM for storage.

In a possible embodiment of the present disclosure, the related information about the LLMF at least includes corresponding RAN identification information.

In a possible embodiment of the present disclosure, the processor is further configured to: subsequent to receiving the first interface setup request message from the NG-RAN node, receive through the transceiver or network interface a predetermined configuration update message from the NG-RAN node; and store the related information about the LLMF carried in the predetermined configuration update message, and feed a predetermined configuration update acknowledgement message back to the NG-RAN node in accordance with the predetermined condition update message. The predetermined configuration update message is an RAN configuration update message or a base station configuration update message, and the predetermined configuration update acknowledgement message is an RAN configuration update acknowledgement message or a base station configuration update acknowledgement message.

In a possible embodiment of the present disclosure, the processor is further configured to, subsequent to feeding the predetermined configuration update acknowledgement message to the NG-RAN node, transmit through the transceiver or network interface the related information about the LLMF carried in the predetermined configuration update message to the UDM for storage.

In still yet another aspect, the present disclosure provides in some embodiments a computer-readable storage medium storing therein a computer program. The computer program is executed by a processor so as to implement the steps of the above-mentioned positioning management method.

In still yet another aspect, the present disclosure provides in some embodiments a positioning management device for an NG-RAN node, including: a first reception module configured to receive a positioning request message from a core network node; a first processing module configured to perform positioning measurement in accordance with the positioning request message, so as to acquire a positioning measurement result; and a second processing module configured to acquire position information about a target UE in accordance with the positioning measurement result, and feed the position information back to the core network node.

In a possible embodiment of the present disclosure, the first processing module includes a first processing sub-module configured to perform the positioning measurement using a target positioning algorithm in accordance with the positioning request message, so as to acquire the positioning measurement result.

In a possible embodiment of the present disclosure, the target positioning algorithm is determined in accordance with positioning capability information about the target UE.

In a possible embodiment of the present disclosure, the performing the positioning measurement using the target positioning algorithm so as to acquire the positioning measurement result includes: transmitting a downlink positioning message to the target UE in accordance with the target positioning algorithm; and performing, by the target UE, the positioning measurement in accordance with the downlink positioning message, and feeding an uplink positioning message back to the NG-RAN node, the uplink positioning message including the positioning measurement result.

In a possible embodiment of the present disclosure, the performing, by the target UE, the positioning measurement in accordance with the downlink positioning message and feeding the uplink positioning message back to the NG-RAN node includes, when the target UE has received the downlink positioning message in an idle state, triggering, by the target UE, a service establishment procedure, performing the positioning measurement in accordance with the downlink positioning message after a service has been established successfully, and feeding the uplink positioning message back to the NG-RAN node.

In a possible embodiment of the present disclosure, the target positioning algorithm is determined in accordance with positioning capability information about the target UE, positioning capability information about the NG-RAN node, and positioning capability information about a network element adjacent to the NG-RAN node. The NG-RAN node and the network element adjacent to the NG-RAN node are both network elements participating in the positioning measurement.

In a possible embodiment of the present disclosure, the performing the positioning measurement using the target positioning algorithm so as to acquire the positioning measurement result includes: transmitting a network positioning message to the network element adjacent to the NG-RAN node in accordance with the target positioning algorithm; and performing, by the network element adjacent to the NG-RAN node, the positioning measurement in accordance with the network positioning message, and feeding the positioning measurement result back to the NG-RAN node.

In a possible embodiment of the present disclosure, the positioning management device further includes: a first transmission module configured to transmit a first interface setup request message to the core network node; and a second reception module configured to receive a first interface setup response message fed back by the network core node in accordance with the first interface setup request message. The first interface setup request message is used to explicitly or implicitly indicate that the NG-RAN node includes an LLMF, a first interface is an NG interface or S1 interface, the NG interface is a communication interface between an NG-RAN and a core network, and the S1 interface is a communication interface between an LTE eNodeB and an EPC.

In a possible embodiment of the present disclosure, when the first interface setup request message is used to indicate that the NG-RAN node includes the LLMF, at least one of the following conditions is met: a condition where the first interface setup request message carries local location function indication information, a condition where the first interface setup request message carries identity information about the LLMF, a condition where the first interface setup request message carries IP address information about the LLMF, and a condition where the first interface setup request message carries positioning capability information about the LLMF.

In a possible embodiment of the present disclosure, the positioning management device further includes: a second transmission module configured to, subsequent to transmitting the first interface setup request message to the core network node, transmit a predetermined configuration update message to the core network node; and a third reception module configured to receive a predetermined configuration update acknowledgement message fed back by the core network node in accordance with the predetermined configuration update message. The predetermined configuration update message carries the positioning capability information about the LLMF, the predetermined configuration update message is an RAN configuration update message or a base station configuration update message, and the predetermined configuration update acknowledgement message is an RAN configuration update acknowledgement message or a base station configuration update acknowledgement message.

In a possible embodiment of the present disclosure, the positioning capability information about the LLMF includes at least one of a positioning algorithm capable of being supported by the LLMF, accuracy of the LLMF, a positioning response time of the LLMF, and a maximum quantity of positioning capable of being supported by the LLMF.

In still yet another aspect, the present disclosure provides in some embodiments a positioning management device for a core network node, including: a third transmission module configured to transmit a positioning request message to an NG-RAN node; and a fourth reception module configured to receive position information about a target UE fed back by the NG-RAN node in accordance with the positioning request message.

In a possible embodiment of the present disclosure, the positioning management device further includes: a fifth reception module configured to receive a first interface setup request message from the NG-RAN node, the first interface setup request message explicitly or implicitly indicating that the NG-RAN node includes an LLMF; and a third processing module configured to store related information about the LLMF carried in the first interface setup request message, and feed a first interface setup response message back to the NG-RAN node in accordance with the first interface setup request message. A first interface is an NG interface or S1 interface, the NG interface is a communication interface between an NG-RAN and a core network, and the S1 interface is a communication interface between an LTE eNodeB and an EPC.

In a possible embodiment of the present disclosure, the positioning management device further includes a fourth transmission module configured to, subsequent to feeding the first interface setup response message back to the NG-RAN node, transmit the related information about the LLMF to a UDM for storage.

In a possible embodiment of the present disclosure, the related information about the LLMF at least includes corresponding RAN identification information.

In a possible embodiment of the present disclosure, the positioning management device further includes: a sixth reception module configured to, subsequent to receiving the first interface setup request message from the NG-RAN node, receive a predetermined configuration update message from the NG-RAN node; and a fourth processing module configured to store the related information about the LLMF carried in the predetermined configuration update message, and feed a predetermined configuration update acknowledgement message back to the NG-RAN node in accordance with the predetermined configuration update message. The predetermined configuration update message is an RAN configuration update message or a base station configuration update message, and the predetermined configuration update acknowledgement message is an RAN configuration update acknowledgement message or a base station configuration update acknowledgement message.

In a possible embodiment of the present disclosure, the positioning management device further includes a fifth transmission module configured to, subsequent to feeding the predetermined configuration update acknowledgement message back to the NG-RAN node, transmit the related information about the LLMF carried in the predetermined configuration update message to the UDM for storage.

The present disclosure has the following beneficial effects. According to the positioning management method in the embodiments of the present disclosure, the positioning request message may be received from the core network node. Next, the positioning measurement may be performed in accordance with the positioning request message so as to acquire the positioning measurement result. Then, the position information about the target UE may be acquired in accordance with the positioning measurement result and fed back to the core network node. As a result, it is able to provide a concise and efficient positioning service in a better manner on the basis of a 5G or any other evolvable technology network, and meet the high-accuracy and low-delay positioning requirements on 5G positioning network architecture, thereby to create larger business value for the society.

DETAILED DESCRIPTION

In order to make the objects, the technical solutions and the advantages of the present disclosure more apparent, the present disclosure will be described hereinafter in a clear and complete manner in conjunction with the drawings and embodiments.

Figure 1:
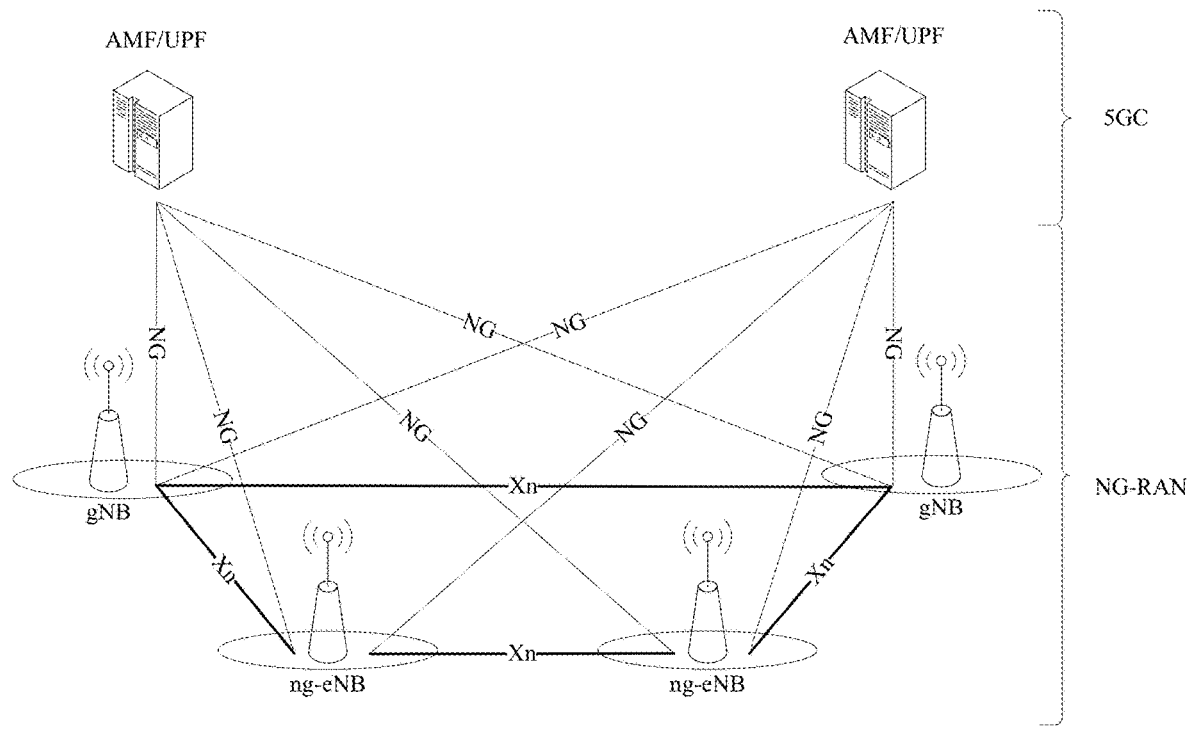
FIG. 1 is a schematic view showing a conventional 5G mobile communication system.
Figure 2:
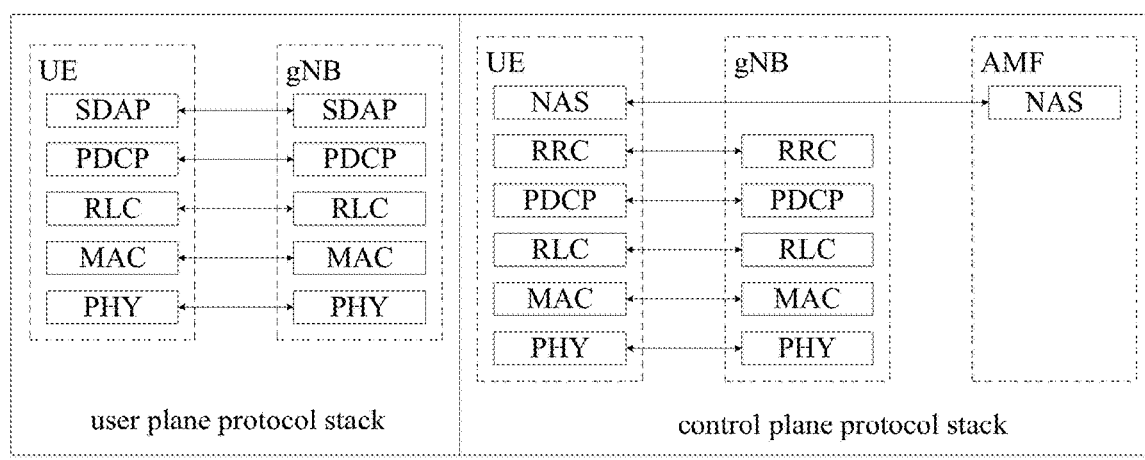
FIG. 2 is a schematic view showing conventional 5G radio protocol architecture.
Figure 3:
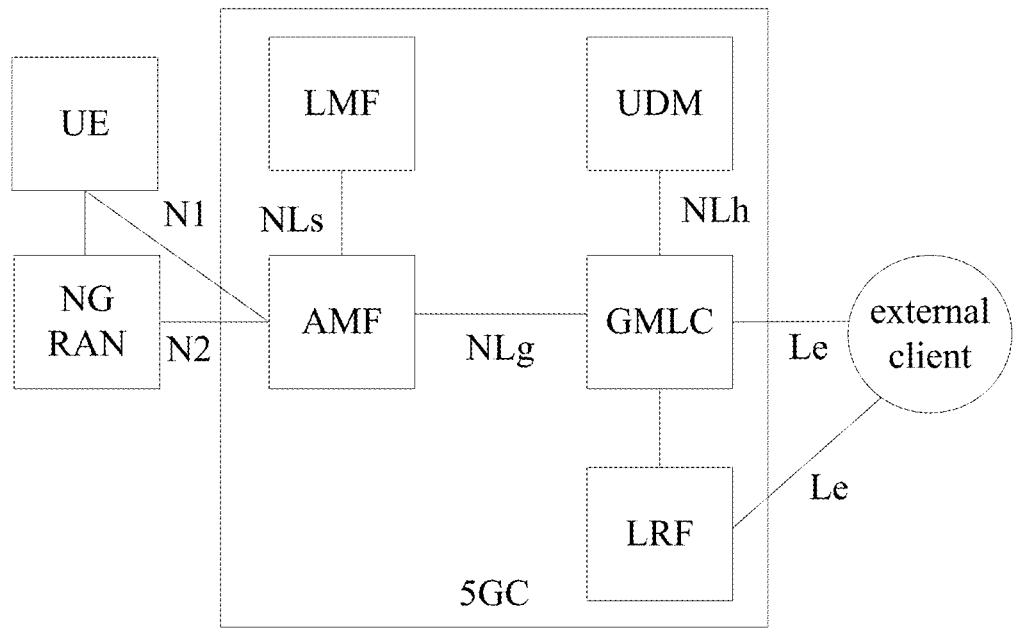
FIG. 3 is a schematic view showing conventional 5G positioning network architecture.
Figure 4:
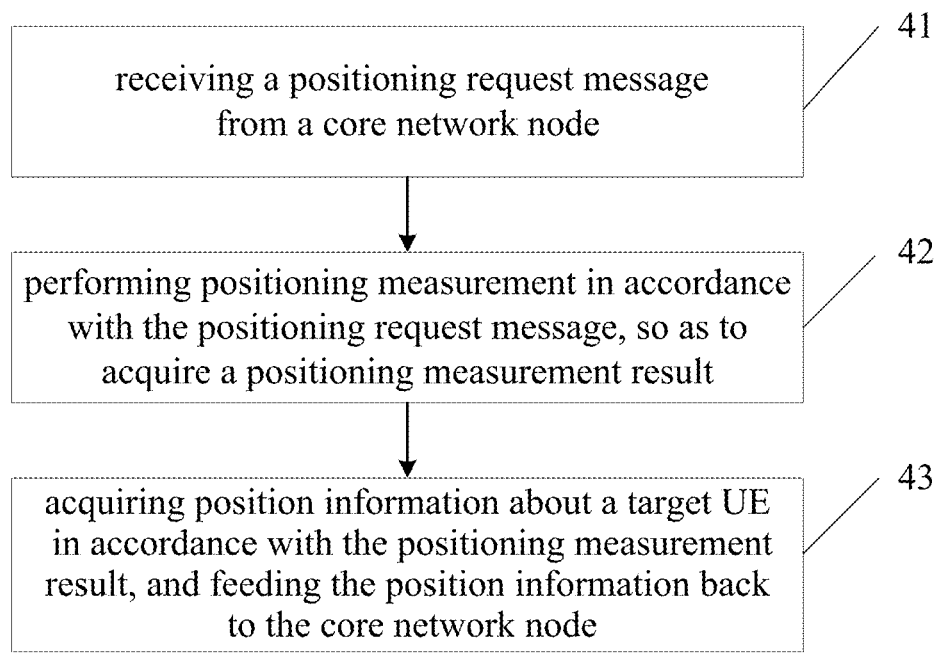
FIG. 4 is a flow chart of a positioning management method according to one embodiment of the present disclosure.

In order to solve the problem in a conventional positioning management scheme where the overall delay is highly demanded in the positioning service, the present disclosure provides in some embodiments a positioning management method for an NG-RAN node which, as shown in FIG. 4, includes: Step 41 of receiving a positioning request message from a core network node; Step 42 of performing positioning measurement in accordance with the positioning request message, so as to acquire a positioning measurement result; and Step 43 of acquiring position information about a target UE in accordance with the positioning measurement result, and feeding the position information back to the core network node.

According to the positioning management method in the embodiments of the present disclosure, the positioning request message may be received from the core network node. Next, the positioning measurement may be performed in accordance with the positioning request message so as to acquire the positioning measurement result. Then, the position information about the target UE may be acquired in accordance with the positioning measurement result and fed back to the core network node. As a result, it is able to provide a concise and efficient positioning service in a better manner on the basis of a 5G or any other evolvable technology network, and meet the high-accuracy and low-delay positioning requirements on 5G positioning network architecture, thereby to create larger business value for the society.

The positioning request message may include such information as a positioning session identity, a target UE identity, and a positioning Quality of Service (QoS) requirement.

To be specific, the performing measurement in accordance with the positioning request message so as to acquire the positioning measurement result may include performing the positioning measurement using a target positioning algorithm in accordance with the positioning request message, so as to acquire the positioning measurement result.

The target positioning algorithm may be one of related algorithms selected in accordance with a condition, and a specific algorithm will not be particularly defined herein.

The performing the positioning measurement will be described hereinafter, but not limited to, the following two examples.

In a first example, the positioning measurement may be performed by a UE.

The target positioning algorithm may be determined in accordance with positioning capability information about the target UE.

To be specific, the performing the positioning measurement using the target positioning algorithm so as to acquire the positioning measurement result may include: transmitting a downlink positioning message to the target UE in accordance with the target positioning algorithm; and performing, by the target UE, the positioning measurement in accordance with the downlink positioning message, and feeding an uplink positioning message back to the NG-RAN node. The uplink positioning message may include the positioning measurement result.

More specifically, the performing, by the target UE, the positioning measurement in accordance with the downlink positioning message and feeding the uplink positioning message back to the NG-RAN node may include, when the target UE has received the downlink positioning message in an idle state, triggering, by the target UE, a service establishment procedure, performing the positioning measurement in accordance with the downlink positioning message after a service has been established successfully, and feeding the uplink positioning message back to the NG-RAN node.

In a second example, the positioning measurement may be performed by a network.

The target positioning algorithm may be determined in accordance with positioning capability information about the target UE, positioning capability information about the NG-RAN node, and positioning capability information about a network element adjacent to the NG-RAN node. The NG-RAN node and the network element adjacent to the NG-RAN node may be both network elements participating in the positioning measurement.

To be specific, the performing the positioning measurement using the target positioning algorithm so as to acquire the positioning measurement result may include: transmitting a network positioning message to the network element adjacent to the NG-RAN node in accordance with the target positioning algorithm; and performing, by the network element adjacent to the NG-RAN node, the positioning measurement in accordance with the network positioning message, and feeding the positioning measurement result back to the NG-RAN node.

In the embodiments of the present disclosure, the positioning management method may further include: transmitting a first interface setup request message to the core network node; and receiving a first interface setup response message fed back by the network core node in accordance with the first interface setup request message. The first interface setup request message may be used to explicitly or implicitly indicate that the NG-RAN node includes an LLMF, a first interface may be an NG interface or S1 interface, the NG interface may be a communication interface between an NG-RAN and a core network, and the S1 interface may be a communication interface between an LTE eNodeB and an EPC.

When the first interface setup request message is used to indicate that the NG-RAN node includes the LLMF, at least one of the following conditions may be met: a condition where the first interface setup request message carries local location function indication information, a condition where the first interface setup request message carries identity information about the LLMF, a condition where the first interface setup request message carries IP address information about the LLMF, and a condition where the first interface setup request message carries positioning capability information about the LLMF. Here, the information may be carried, but not limited to, in an explicit manner.

Furthermore, in the embodiments of the present disclosure, subsequent to transmitting the first interface setup request message to the core network node, the positioning management method may further include: transmitting a predetermined configuration update message to the core network node; and receiving a predetermined configuration update acknowledgement message fed back by the core network node in accordance with the predetermined configuration update message. The predetermined configuration update message may carry the positioning capability information about the LLMF, the predetermined configuration update message may be an RAN configuration update message or a base station configuration update message, and the predetermined configuration update acknowledgement message may be an RAN configuration update acknowledgement message or a base station configuration update acknowledgement message.

The positioning capability information about the LLMF may include at least one of a positioning algorithm capable of being supported by the LLMF, accuracy of the LLMF, a positioning response time of the LLMF, and a maximum quantity of positioning capable of being supported by the LLMF.

Figure 5:
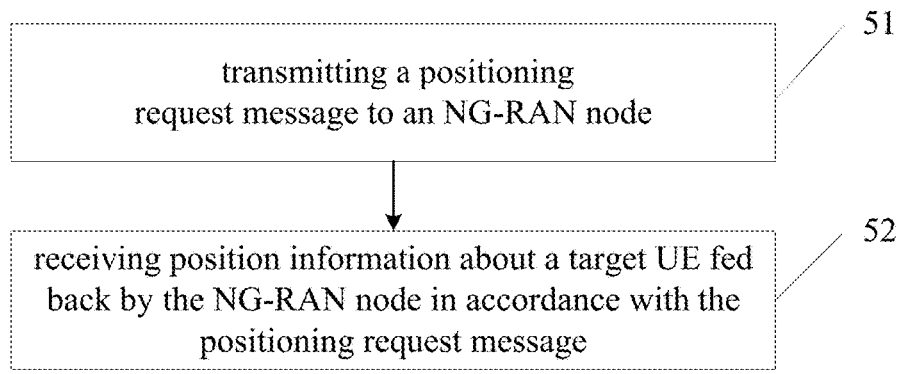
FIG. 5 is another flow chart of the positioning management method according to one embodiment of the present disclosure.

The present disclosure further provides in some embodiments a positioning management method for a core network node which, as shown in FIG. 5, includes: Step 51 of transmitting a positioning request message to an NG-RAN node; and Step 52 of receiving position information about a target UE fed back by the NG-RAN node in accordance with the positioning request message.

According to the positioning management method in the embodiments of the present disclosure, the positioning request message may be transmitted to the NG-RAN node, and then the position information about the target end may be received from the NG-RAN node in accordance with the positioning request message. As a result, it is able to provide a concise and efficient positioning service in a better manner on the basis of a 5G or any other evolvable technology network, and meet the high-accuracy and low-delay positioning requirements on 5G positioning network architecture, thereby to create larger business value for the society.

In the embodiments of the present disclosure, the positioning management method may further include: receiving a first interface setup request message from the NG-RAN node, the first interface setup request message explicitly or implicitly indicating that the NG-RAN node includes an LLMF; and storing related information about the LLMF carried in the first interface setup request message, and feeding a first interface setup response message back to the NG-RAN node in accordance with the first interface setup request message. A first interface may be an NG interface or S1 interface, the NG interface may be a communication interface between an NG-RAN and a core network, and the S1 interface may be a communication interface between an LTE eNodeB and an EPC.

To be specific, when the first interface setup request message is used to indicate that the NG-RAN node includes the LLMF, at least one of the following conditions may be met: a condition where the first interface setup request message carries local location function indication information, a condition where the first interface setup request message carries identity information about the LLMF, a condition where the first interface setup request message carries IP address information about the LLMF, and a condition where the first interface setup request message carries positioning capability information about the LLMF.

Subsequent to feeding the first interface setup response message back to the NG-RAN node, the positioning management method may further include transmitting the related information about the LLMF to a UDM for storage.

The related information about the LLMF may at least include corresponding RAN identification information.

More specifically, subsequent to receiving the first interface setup request message from the NG-RAN node, the positioning management method may further include: receiving a predetermined configuration update message from the NG-RAN node; and storing the related information about the LLMF carried in the predetermined configuration update message, and feeding a predetermined configuration update acknowledgement message back to the NG-RAN node in accordance with the predetermined configuration update message. The predetermined configuration update message may be an RAN configuration update message or a base station configuration update message, and the predetermined configuration update acknowledgement message may be an RAN configuration update acknowledgement message or a base station configuration update acknowledgement message.

More specifically, subsequent to feeding the predetermined configuration update acknowledgement message back to the NG-RAN node, the positioning management method may further include transmitting the related information about the LLMF carried in the predetermined configuration update message to the UDM for storage.

The positioning management method will be described hereinafter in conjunction with the NG-RAN node and the core network node.

With respect to the above-mentioned technical problem, the present disclosure provides in some embodiments a positioning management method, so as to provide a concise and efficient positioning service in a better manner on the basis of a 5G or any other evolvable technology network, and meet the high-accuracy and low-delay positioning requirements on 5G positioning network architecture. Correspondingly, there exists positioning network architecture, e.g., a sunken positioning function, so as to meet the service requirement to acquire a positioning service with lower latency under the 5G positioning network architecture, thereby to create larger business value for the society.

In the scheme provided in the embodiments of the present disclosure, the LLMF may be located in an access network, e.g., may be co-located with an NR gNB. The LLMF may at least the following sub-functions: selection and decision of a positioning method; calculation of a UE position; collection of a positioning measurement; and processing of positioning information. When the NR gNB establishes an NG connection with the core network, it may explicitly or implicitly notify the core network of the supported LLMF. In a possible embodiment of the present disclosure, identify (ID) information carrying the LLMF, IP address information carrying the LLMF or positioning capability information may be transmitted to the core network.

The positioning capability information may at least include, but not limited to, such information as a positioning algorithm that is possibly supported, corresponding accuracy, a positioning response time, or the maximum quantity of positioning that is capable of being supported.

The LLMF may be allowed to separately report or uprate its capability information to the core network. When there is a position demand for the core network, the positioning request message may be transmitted to the LLMF, and subsequently the LLMF may trigger a positioning procedure and return a positioning calculation result to the core network.

The following processes will be specifically involved. However, these processes are for illustrative purposes only, and the present disclosure shall not be limited thereto.

Figure 6:
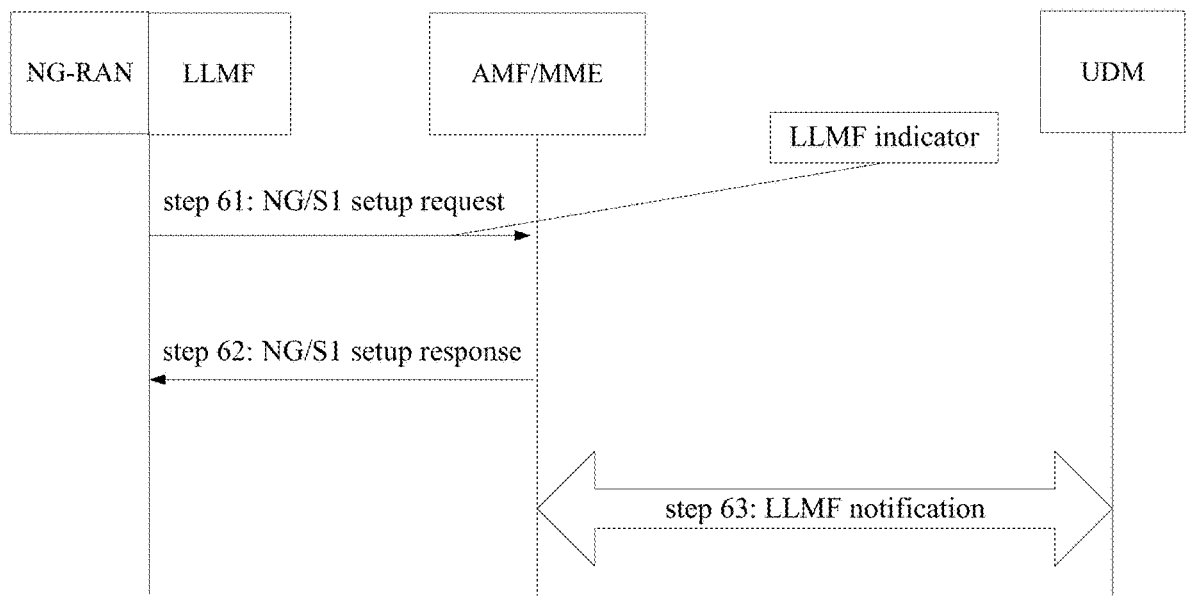
FIG. 6 is a schematic view showing the reporting and indication of an local LMF according to one embodiment of the present disclosure.

First procedure: as shown in FIG. 6, a reporting and indication procedure of the LLMF may include the following steps.

Step 61: when initiating an NG/S1 setup procedure with respect to the core network (e.g., an AMF or a Mobility Management Entity (MME)), the NG-RAN needs to explicitly or implicitly indicate the LLMF in an NG/S1 setup request, e.g., explicitly carry indication information about the LLMF, ID information carrying the LLMF, IP address information carrying the LLMF, or positioning capability information carrying the LLMF, or indicates that the NG-RAN supports the LLMF in any other implicit manner.

An IP address of the LLMF may be used subsequently during the transmission of an NLs AP message (an interface message between the LLMF and the AMF) or an SLs AP message (an interface message between the LLMF and the MME).

An ID of the LLMF may be subsequently used by a core network-related entity, e.g., AMF or LMF to inquire such information as related capability from a storage center or Operation, Administration and Management (OAM).

The positioning capability information may include, but not limited to such information as a positioning algorithm possibly supported by the LLMF, corresponding accuracy, a positioning response time, or the maximum quantity of positioning that is supported.

In FIG. 6, LLMF Indicators represents an LLMF indicator.

Step 62: the AMF or MME may store the corresponding information carried in the NG/S1 setup request, and return an NG/S1 setup response.

Step 63: in a possible embodiment of the present disclosure, the AMF or MME may transmit LLMF related information (at least including corresponding RAN ID information, e.g., NG-RAN ID) to the UDM for storage and the subsequent selection of a positioning management function.

Figure 7:
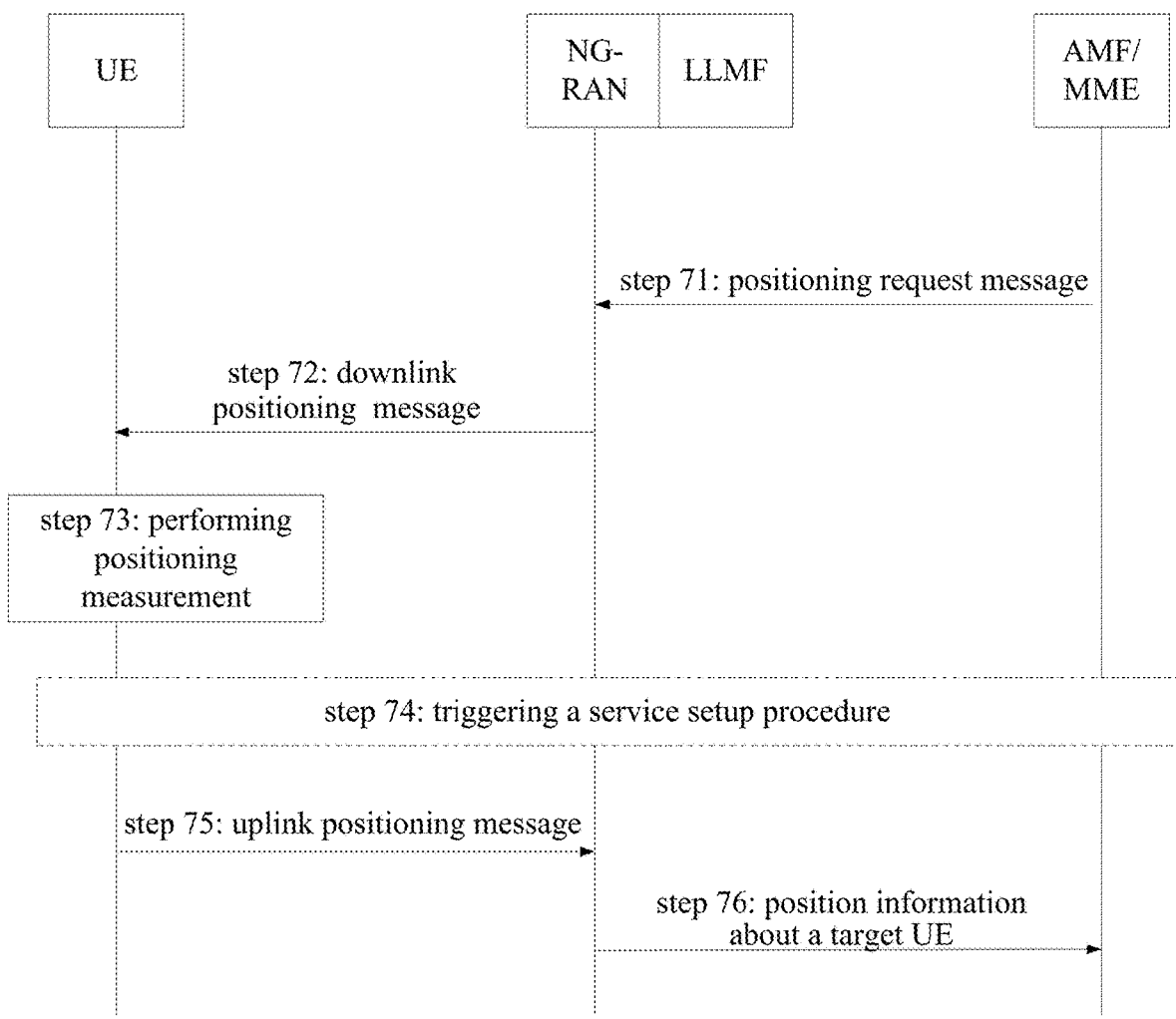
FIG. 7 is a schematic view showing a positioning service of the local LMF according to one embodiment of the present disclosure.

Second procedure: as shown in FIG. 7, a positioning service procedure of the LLMF, i.e., a UE positioning method, may include the following steps.

Step 71: the AMF or MME may transmit the positioning request message to the LLMF through an NLs or SLs interface, and the positioning request message may include such information as a positioning session ID, a target UE ID, and a positioning QoS requirement.

Step 72: the LLMF may select an appropriate positioning algorithm (i.e., the target positioning algorithm) in accordance with a positioning capability of the target UE, and transmitting a downlink positioning message to the target UE.

Step 73: the target UE may perform the positioning measurement.

Step 74: optionally, when the target UE is in an idle state, the target UE may trigger a service setup procedure at first, otherwise, this step may be omitted.

Step 75: the target UE may transmit an uplink positioning message to the LLMF, and the uplink positioning message may include such information as a positioning measurement result.

Step 76: the LLMF may acquire through calculation position information about the target UE, and feed the position information about the target UE back to the AMF or MME.

Figure 8:
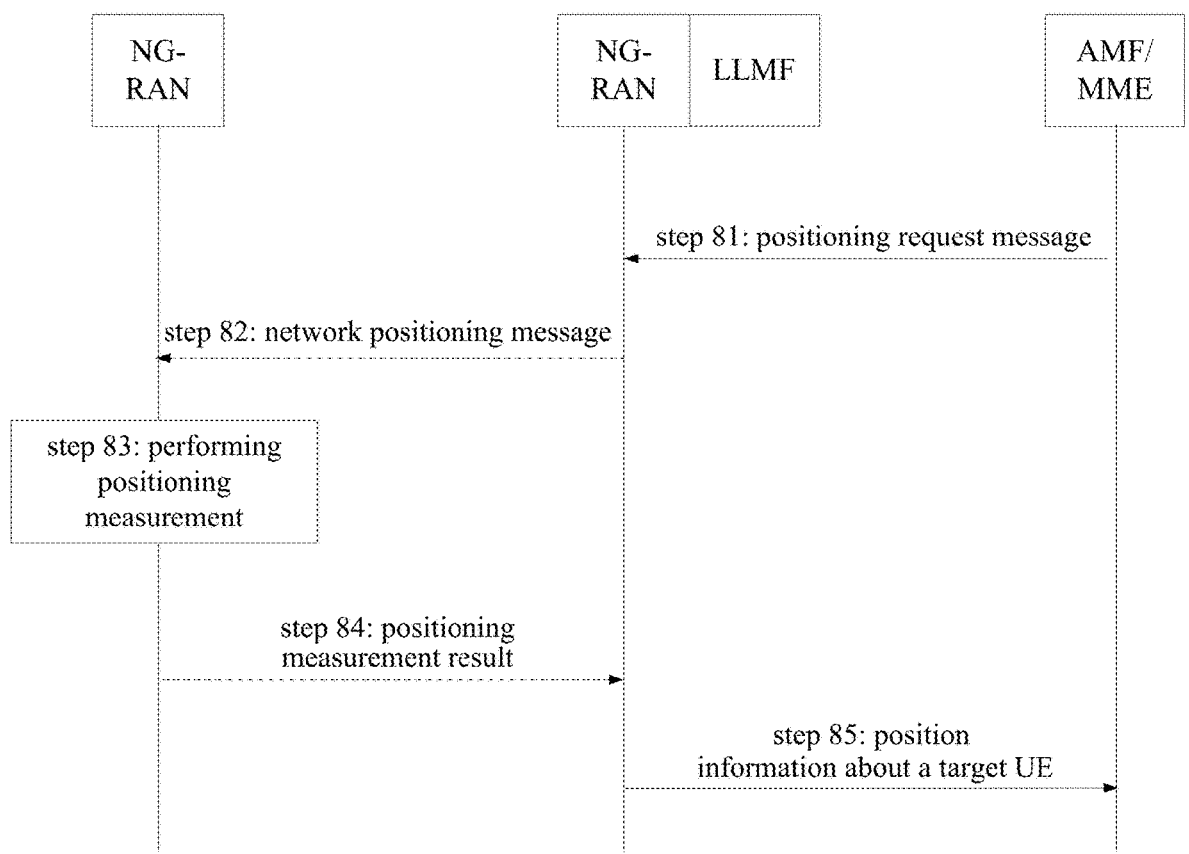
FIG. 8 is another schematic view showing the positioning service of the local LMF according to one embodiment of the present disclosure.

Third procedure: as shown in FIG. 8, a positioning service procedure of the LLMF, i.e., a network positioning method, may include the following steps.

Step 81: the AMF or MME may transmit a positioning request message to the LLMF through an NLs or SLs interface, and the positioning request message may include such information as a positioning session ID, a target UE ID, and a positioning QoS requirement.

Step 82: the LLMF may select an appropriate network-based positioning algorithm (i.e., the above-mentioned target positioning algorithm) in accordance with a network positioning capability (a positioning capability of the NG-RAN node and a positioning capability of a network element adjacent to the NG-RAN node, the NG-RAN node and the network element adjacent to the NG-RAN node being both network elements participating in the positioning measurement) and a positioning capability of the target UE, and then transmit a network positioning message to a corresponding network element.

In a possible embodiment of the present disclosure, when the network element participating in the positioning measurement merely includes the RAN node where the LLMF is located, the network positioning message may not be transmitted any more.

Step 83: the network element may perform the positioning measurement.

Step 84: the corresponding network element may return a positioning measurement result to an entity where the LLMF is located.

In a possible embodiment of the present disclosure, when the network element participating in the positioning measurement merely includes the RAN node where the LLMF is located, this step may be omitted.

Step 85: the LLMF may acquire through calculation position information about the target UE, and then feed the position information about the target UE to the AMF or MME.

Figure 9:
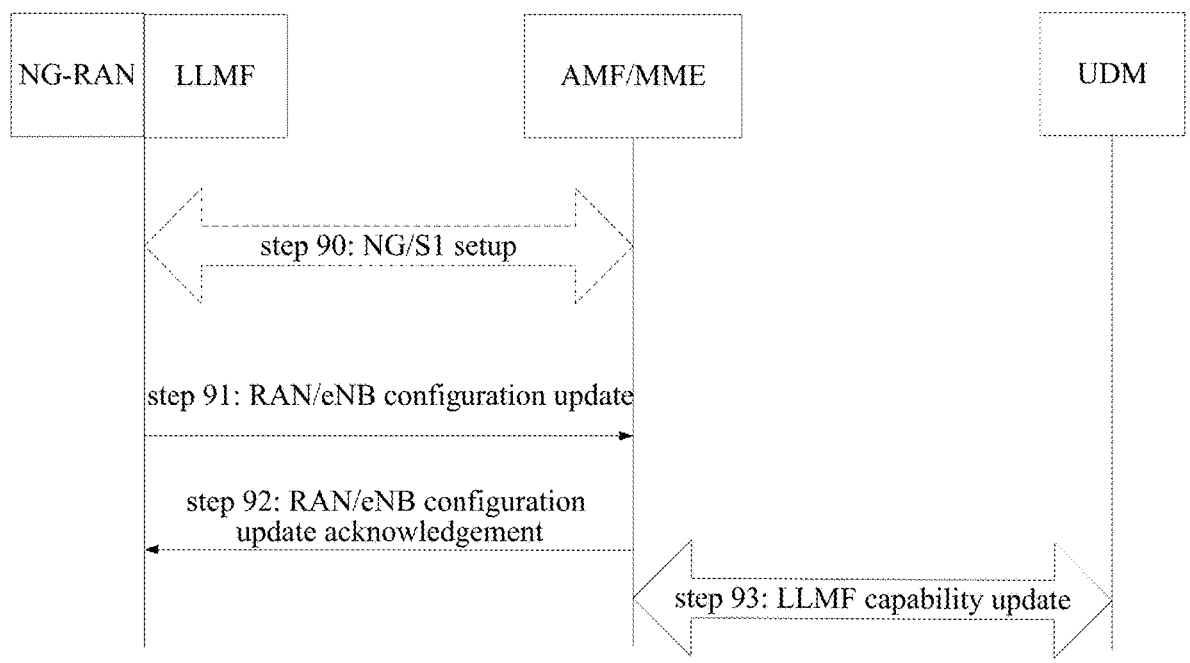
FIG. 9 is a schematic view showing the reporting and updating of a positioning capability of the local LMF according to one embodiment of the present disclosure.

Fourth procedure: as shown in FIG. 9, a reporting and updating procedure of an LLMF positioning capability may include the following steps.

Step 90: with reference to the first procedure, corresponding positioning capability information may be transmitted in an NG/S1 setup procedure.

Step 91: the NG-RAN node may carry positioning capability information about the LLMF in a subsequently-initiated RAN or ENB CONFIGURATION UPDATE message. The positioning capability information may include, but not limited to, such information as a positioning algorithm possibly supported by the LLMF, corresponding accuracy, a positioning response time, or the maximum quantity of positioning that is capable of being supported.

Step 92: the AMF or MME may store the corresponding information carried in the RAN or ENB CONFIGURATION UPDATE message, and return an RAN or ENB CONFIGURATION UPDATE ACK message.

Step 93: optionally, the AMF or MME may transmit the capability related information to the UDM for storage and the subsequent selection of the positioning management function.

Based on the above, the present disclosure provides a scheme with sunken positioning management function, so as to provide a concise and efficient positioning service in a better manner on the basis of a 5G or any other evolvable technology network, and meet the high-accuracy and low-delay positioning requirements on 5G positioning network architecture, thereby to create larger business value for the society.

The present disclosure further provides in some embodiments an NG-RAN node, which includes a memory, a processor, a computer program stored in the memory and executed by the processor, and a transceiver or network interface. The processor is configured to execute the program so as to: receive through the transceiver or network interface a positioning request message from a core network node; perform positioning measurement in accordance with the positioning request message, so as to acquire a positioning measurement result; and acquire position information about a target UE in accordance with the positioning measurement result, and feed the position information back to the core network node.

According to the NG-RAN node in the embodiments of the present disclosure, the positioning request message may be received from the core network node through the transceiver or network interface, the positioning measurement may be performed in accordance with the positioning request message so as to acquire the positioning measurement result, and then the position information about the target UE may be acquired in accordance with the positioning measurement result and fed back to the core network node. As a result, it is able to provide a concise and efficient positioning service in a better manner on the basis of a 5G or any other evolvable technology network, and meet the high-accuracy and low-delay positioning requirements on 5G positioning network architecture, thereby to create larger business value for the society.

Figure 10:
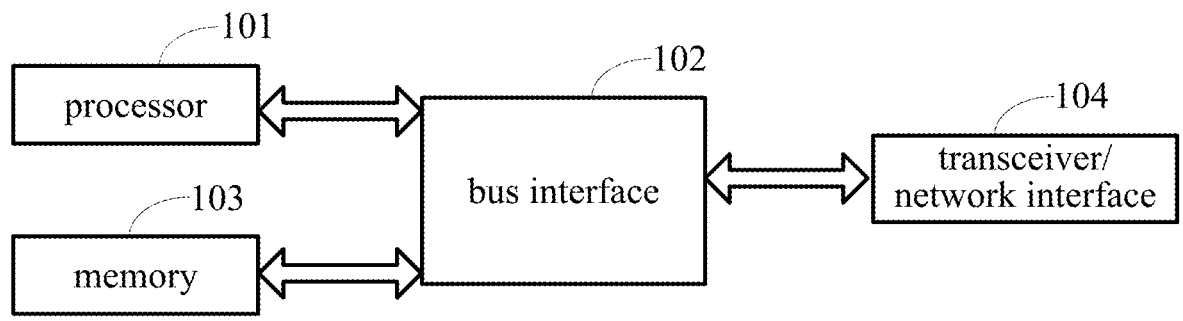
FIG. 10 is a structural schematic view showing an NG-RAN node according to one embodiment of the present disclosure.

To be specific, as shown in FIG. 10, the NG-RAN node may include a processor 101, and a memory 103 connected to the processor 101 via a bus interface 102 and configured to store therein programs and data for the operation of the processor 101. The processor 101 is configured to call and execute the programs and data stored in the memory 103, so as to: receive through a transceiver or network interface 104 a positioning request message from a core network node; perform positioning measurement in accordance with the positioning request message, so as to acquire a positioning measurement result; and acquire position information about a target UE in accordance with the positioning measurement result, and feed the position information back to the core network node.

The transceiver or network interface 104 may be connected to the bus interface 102, and configured to receive and transmit data under the control of the processor 101.

It should be appreciated that, in FIG. 10, bus architecture may include a number of buses and bridges connected to each other, so as to connect various circuits for one or more processors 101 and one or more memories 103. In addition, as is known in the art, the bus architecture may be used to connect any other circuits, such as a circuit for a peripheral device, a circuit for a voltage stabilizer and a power management circuit. The bus interface may be provided, and the transceiver or network interface 104 may consist of a plurality of elements, i.e., a transmitter and a receiver for communication with any other devices over a transmission medium. The processor 101 may take charge of managing the bus architecture as well as general processings. The memory 103 may store therein data for the operation of the processor 101.

It should be appreciated that, all of, or parts of, the steps may be implemented through hardware, or implemented through relevant hardware under the control of a computer program. The computer program may include instructions for executing parts of, or all of, the steps of the method, and it may be stored in a computer-readable storage medium in any form, e.g., a volatile or non-volatile computer-readable storage medium.

To be specific, the processor is configured to perform the positioning measurement using a target positioning algorithm in accordance with the positioning request message, so as to acquire the positioning measurement result.

The performing the positioning measurement will be described hereinafter in conjunction with, but not limited to, the following two examples.

In a first example, the positioning measurement may be performed by a UE.

The target positioning algorithm may be determined in accordance with positioning capability information about the target UE.

To be specific, the performing the positioning measurement using the target positioning algorithm so as to acquire the positioning measurement result may include: transmitting a downlink positioning message to the target UE in accordance with the target positioning algorithm; and performing, by the target UE, the positioning measurement in accordance with the downlink positioning message, and feeding an uplink positioning message back to the NG-RAN node. The uplink positioning message may include the positioning measurement result.

More specifically, the performing, by the target UE, the positioning measurement in accordance with the downlink positioning message and feeding the uplink positioning message back to the NG-RAN node may include, when the target UE has received the downlink positioning message in an idle state, triggering, by the target UE, a service establishment procedure, performing the positioning measurement in accordance with the downlink positioning message after a service has been established successfully, and feeding the uplink positioning message back to the NG-RAN node.

In a second example, the positioning measurement may be performed by a network.

The target positioning algorithm may be determined in accordance with positioning capability information about the target UE, positioning capability information about the NG-RAN node, and positioning capability information about a network element adjacent to the NG-RAN node. The NG-RAN node and the network element adjacent to the NG-RAN node may be both network elements participating in the positioning measurement.

To be specific, the performing the positioning measurement using the target positioning algorithm so as to acquire the positioning measurement result may include: transmitting a network positioning message to the network element adjacent to the NG-RAN node in accordance with the target positioning algorithm; and performing, by the network element adjacent to the NG-RAN node, the positioning measurement in accordance with the network positioning message, and feeding the positioning measurement result back to the NG-RAN node.

In the embodiments of the present disclosure, the processor is further configured to: transmit through the transceiver or network interface a first interface setup request message to the core network node; and receive a first interface setup response message fed back by the network core node in accordance with the first interface setup request message. The first interface setup request message may be used to explicitly or implicitly indicate that the NG-RAN node includes an LLMF, a first interface may be an NG interface or S1 interface, the NG interface may be a communication interface between an NG-RAN and a core network, and the S1 interface may be a communication interface between an LTE eNodeB and an EPC.

When the first interface setup request message is used to indicate that the NG-RAN node includes the LLMF, at least one of the following conditions may be met: a condition where the first interface setup request message carries local location function indication information, a condition where the first interface setup request message carries identity information about the LLMF, a condition where the first interface setup request message carries IP address information about the LLMF, and a condition where the first interface setup request message carries positioning capability information about the LLMF.

The processor is further configured to: subsequent to transmitting the first interface setup request message to the core network node, transmit through the transceiver or network interface a predetermined configuration update message to the core network node; and receive a predetermined configuration update acknowledgement message fed back by the core network node in accordance with the predetermined configuration update message. The predetermined configuration update message may carry the positioning capability information about the LLMF, the predetermined configuration update message may be an RAN configuration update message or a base station configuration update message, and the predetermined configuration update acknowledgement message may be an RAN configuration update acknowledgement message or a base station configuration update acknowledgement message.

The positioning capability information about the LLMF may include at least one of a positioning algorithm capable of being supported by the LLMF, accuracy of the LLMF, a positioning response time of the LLMF, and a maximum quantity of positioning capable of being supported by the LLMF.

The implementation of the above-mentioned positioning management method for the NG-RAN node may be applied to the embodiments of the NG-RAN node, with a same technical effect.

The present disclosure further provides in some embodiments a core network node, which includes a memory, a processor, a computer program stored in the memory and executed by the processor, and a transceiver or network interface. The processor is configured to execute the computer program so as to: transmit through the transceiver or network interface a positioning request message to an NG-RAN node; and receive position information about a target UE fed back by the NG-RAN node in accordance with the positioning request message.

According to the core network node in the embodiments of the present disclosure, the positioning request message may be transmitted through the transceiver or network interface to the NG-RAN node, and then the position information about the target UE may be received from the NG-RAN in accordance with the positioning request message. As a result, it is able to provide a concise and efficient positioning service in a better manner on the basis of a 5G or any other evolvable technology network, and meet the high-accuracy and low-delay positioning requirements on 5G positioning network architecture, thereby to create larger business value for the society.

Figure 11:
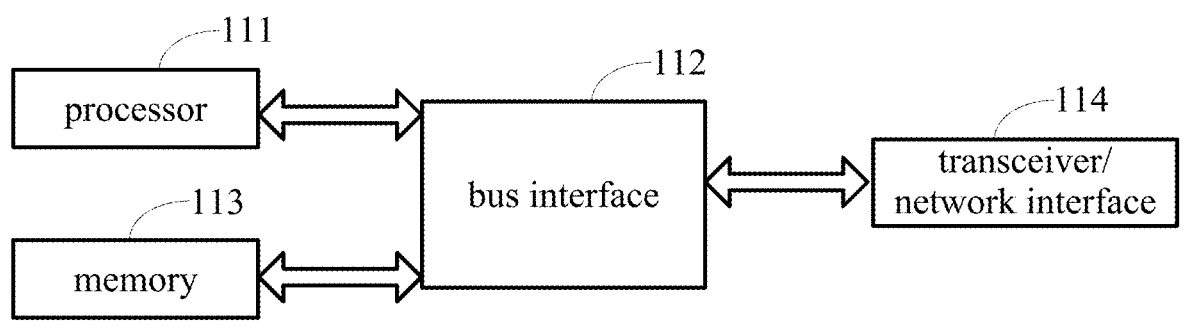
FIG. 11 is a structural schematic view showing a core network node according to one embodiment of the present disclosure.

To be specific, as shown in FIG. 11, the core network node in the embodiments of the present disclosure may include a processor 11, and a memory 113 connected to the processor 111 via a bus interface 112 and configured to store therein programs and data for the operation of the processor 111. The processor 111 is configured to call and execute the programs and data stored in the memory 113, so as to: transmit through a transceiver or network interface 114 a positioning request message to an NG-RAN node; and receive position information about a target UE fed back by the NG-RAN node in accordance with the positioning request message.

The transceiver or network interface 114 may be connected to the bus interface 112, and configured to receive and transmit data under the control of the processor 111.

It should be appreciated that, in FIG. 11, bus architecture may include a number of buses and bridges connected to each other, so as to connect various circuits for one or more processors 111 and one or more memories 113. In addition, as is known in the art, the bus architecture may be used to connect any other circuits, such as a circuit for a peripheral device, a circuit for a voltage stabilizer and a power management circuit. The bus interface may be provided, and the transceiver or network interface 114 may consist of a plurality of elements, i.e., a transmitter and a receiver for communication with any other devices over a transmission medium. The processor 111 may take charge of managing the bus architecture as well as general processings. The memory 113 may store therein data for the operation of the processor 111.

It should be appreciated that, all of, or parts of, the steps may be implemented through hardware, or implemented through relevant hardware under the control of a computer program. The computer program may include instructions for executing parts of, or all of, the steps of the method, and it may be stored in a computer-readable storage medium in any form.

In the embodiments of the present disclosure, the processor is further configured to: receive through the transceiver or network interface a first interface setup request message from the NG-RAN node, the first interface setup request message explicitly or implicitly indicating that the NG-RAN node includes an LLMF; and store related information about the LLMF carried in the first interface setup request message, and feed a first interface setup response message back to the NG-RAN node in accordance with the first interface setup request message. A first interface may be an NG interface or S1 interface, the NG interface may be a communication interface between an NG-RAN and a core network, and the S1 interface may be a communication interface between an LTE eNodeB and an EPC.

The processor is further configured to, subsequent to feeding the first interface setup response message back to the NG-RAN node, transmit through the transceiver or network interface the related information about the LLMF to a UDM for storage.

The related information about the LLMF may at least include corresponding RAN identification information.

The processor is further configured to: subsequent to receiving the first interface setup request message from the NG-RAN node, receive through the transceiver or network interface a predetermined configuration update message from the NG-RAN node; and store the related information about the LLMF carried in the predetermined configuration update message, and feed a predetermined configuration update acknowledgement message back to the NG-RAN node in accordance with the predetermined configuration update message. The predetermined configuration update message may be an RAN configuration update message or a base station configuration update message, and the predetermined configuration update acknowledgement message may be an RAN configuration update acknowledgement message or a base station configuration update acknowledgement message.

The processor is further configured to, subsequent to feeding the predetermined configuration update acknowledgement message back to the NG-RAN node, transmit through the transceiver or network interface the related information about the LLMF carried in the predetermined configuration update message to the UDM for storage.

The implementation of the above-mentioned positioning management method for the core network node may be applied to the embodiments of the core network node, with a same technical effect.

The present disclosure further provides in some embodiments a computer-readable storage medium storing therein a computer program. The computer program is executed by a processor, so as to implement the steps of the above-mentioned positioning management method for the NG-RAN node, or implement the steps of the above-mentioned positioning management method for the core network node.

The implementation of the above-mentioned positioning management method for the NG-RAN node or the core network node may be applied to the embodiments of the computer-readable storage medium, with a same technical effect.

Figure 12:
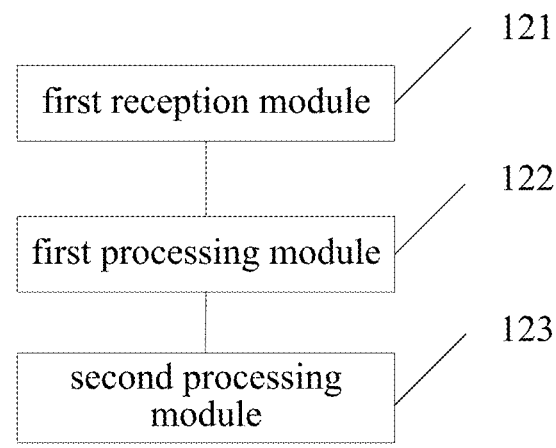
FIG. 12 is a structural schematic view showing a positioning management device according to one embodiment of the present disclosure.

The present disclosure further provides in some embodiments a positioning management device for an NG-RAN node which, as shown in FIG. 12, includes: a first reception module 121 configured to receive a positioning request message from a core network node; a first processing module 122 configured to perform positioning measurement in accordance with the positioning request message, so as to acquire a positioning measurement result; and a second processing module 123 configured to acquire position information about a target UE in accordance with the positioning measurement result, and feed the position information back to the core network node.

According to the positioning management device in the embodiments of the present disclosure, the positioning request message may be received from the core network node. Next, the positioning measurement may be performed in accordance with the positioning request message so as to acquire the positioning measurement result. Then, the position information about the target UE may be acquired in accordance with the positioning measurement result and fed back to the core network node. As a result, it is able to provide a concise and efficient positioning service in a better manner on the basis of a 5G or any other evolvable technology network, and meet the high-accuracy and low-delay positioning requirements on 5G positioning network architecture, thereby to create larger business value for the society.

To be specific, the first processing module includes a first processing sub-module configured to perform the positioning measurement using a target positioning algorithm in accordance with the positioning request message, so as to acquire the positioning measurement result.

The performing the positioning measurement will be described hereinafter in conjunction with, but not limited to, the following two examples.

In a first example, the positioning measurement may be performed by a UE.

The target positioning algorithm may be determined in accordance with positioning capability information about the target UE.

To be specific, the performing the positioning measurement using the target positioning algorithm so as to acquire the positioning measurement result may include: transmitting a downlink positioning message to the target UE in accordance with the target positioning algorithm; and performing, by the target UE, the positioning measurement in accordance with the downlink positioning message, and feeding an uplink positioning message back to the NG-RAN node. The uplink positioning message may include the positioning measurement result.

More specifically, the performing, by the target UE, the positioning measurement in accordance with the downlink positioning message and feeding the uplink positioning message back to the NG-RAN node may include, when the target UE has received the downlink positioning message in an idle state, triggering, by the target UE, a service establishment procedure, performing the positioning measurement in accordance with the downlink positioning message after a service has been established successfully, and feeding the uplink positioning message back to the NG-RAN node.

In a second example, the positioning measurement may be performed by a network.

The target positioning algorithm may be determined in accordance with positioning capability information about the target UE, positioning capability information about the NG-RAN node, and positioning capability information about a network element adjacent to the NG-RAN node. The NG-RAN node and the network element adjacent to the NG-RAN node may be both network elements participating in the positioning measurement.

To be specific, the performing the positioning measurement using the target positioning algorithm so as to acquire the positioning measurement result may include: transmitting a network positioning message to the network element adjacent to the NG-RAN node in accordance with the target positioning algorithm; and performing, by the network element adjacent to the NG-RAN node, the positioning measurement in accordance with the network positioning message, and feeding the positioning measurement result back to the NG-RAN node.

In the embodiments of the present disclosure, the positioning management device may further include: a first transmission module configured to transmit a first interface setup request message to the core network node; and a second reception module configured to receive a first interface setup response message fed back by the network core node in accordance with the first interface setup request message. The first interface setup request message is used to explicitly or implicitly indicate that the NG-RAN node includes an LLMF, a first interface is an NG interface or S1 interface, the NG interface is a communication interface between an NG-RAN and a core network, and the S1 interface is a communication interface between an LTE eNodeB and an EPC.

When the first interface setup request message is used to indicate that the NG-RAN node includes the LLMF, at least one of the following conditions is met: a condition where the first interface setup request message carries local location function indication information, a condition where the first interface setup request message carries identity information about the LLMF, a condition where the first interface setup request message carries IP address information about the LLMF, and a condition where the first interface setup request message carries positioning capability information about the LLMF.

In the embodiments of the present disclosure, the positioning management device may further include: a second transmission module configured to, subsequent to transmitting the first interface setup request message to the core network node, transmit a predetermined configuration update message to the core network node; and a third reception module configured to receive a predetermined configuration update acknowledgement message fed back by the core network node in accordance with the predetermined configuration update message. The predetermined configuration update message carries the positioning capability information about the LLMF, the predetermined configuration update message is an RAN configuration update message or a base station configuration update message, and the predetermined configuration update acknowledgement message is an RAN configuration update acknowledgement message or a base station configuration update acknowledgement message.

The positioning capability information about the LLMF may include at least one of a positioning algorithm capable of being supported by the LLMF, accuracy of the LLMF, a positioning response time of the LLMF, and a maximum quantity of positioning capable of being supported by the LLMF.

The implementation of the above-mentioned positioning management method for the NG-RAN node may be applied to the embodiments of the positioning management device, with a same technical effect.

Figure 13:
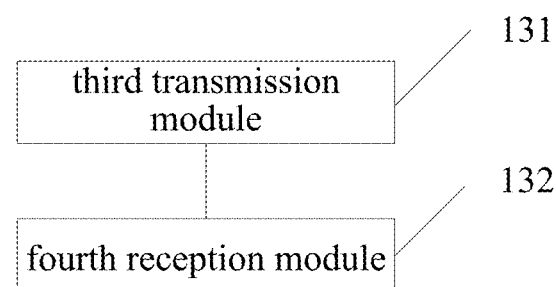
FIG. 13 is another structural schematic view showing the positioning management device according to one embodiment of the present disclosure.

The present disclosure further provides in some embodiments a positioning management device for a core network node which, as shown in FIG. 13, includes: a third transmission module 131 configured to transmit a positioning request message to an NG-RAN node; and a fourth reception module 132 configured to receive position information about a target UE fed back by the NG-RAN node in accordance with the positioning request message.

According to the positioning management device in the embodiments of the present disclosure, the positioning request message may be transmitted to the NG-RAN node, and the position information about the target UE may be received by the NG-RAN node in accordance with the positioning request message. As a result, it is able to provide a concise and efficient positioning service in a better manner on the basis of a 5G or any other evolvable technology network, and meet the high-accuracy and low-delay positioning requirements on 5G positioning network architecture, thereby to create larger business value for the society.

In the embodiments of the present disclosure, the positioning management device may further include: a fifth reception module configured to receive a first interface setup request message from the NG-RAN node, the first interface setup request message explicitly or implicitly indicating that the NG-RAN node includes an LLMF; and a third processing module configured to store related information about the LLMF carried in the first interface setup request message, and feed a first interface setup response message back to the NG-RAN node in accordance with the first interface setup request message. A first interface is an NG interface or S1 interface, the NG interface is a communication interface between an NG-RAN and a core network, and the S1 interface is a communication interface between an LTE eNodeB and an EPC.

The positioning management device may further include a fourth transmission module configured to, subsequent to feeding the first interface setup response message back to the NG-RAN node, transmit the related information about the LLMF to a UDM for storage.

The related information about the LLMF may at least include corresponding RAN identification information.

The positioning management device may further include: a sixth reception module configured to, subsequent to receiving the first interface setup request message from the NG-RAN node, receive a predetermined configuration update message from the NG-RAN node; and a fourth processing module configured to store the related information about the LLMF carried in the predetermined configuration update message, and feed a predetermined configuration update acknowledgement message back to the NG-RAN node in accordance with the predetermined configuration update message. The predetermined configuration update message may be an RAN configuration update message or a base station configuration update message, and the predetermined configuration update acknowledgement message may be an RAN configuration update acknowledgement message or a base station configuration update acknowledgement message.

The positioning management device may further include a fifth transmission module configured to, subsequent to feeding the predetermined configuration update acknowledgement message back to the NG-RAN node, transmit the related information about the LLMF carried in the predetermined configuration update message to the UDM for storage.

The implementation of the above-mentioned positioning management method for the core network node may be applied to the embodiments of the positioning management device, with a same technical effect.

It should be appreciated that, the functional members described in the specification may be referred to as modules or sub-modules, so as to emphasize the independence of the implementation in a more particular manner.

In the embodiments of the present disclosure, the modules or sub-modules may be implemented by software, so as to be executed by various processors. For example, an identified, executable code module may comprise one or more physical or logical blocks including computer instructions and the module can be constructed as an image, a process or a function. Even so, the executable codes of the identified modules are unnecessary to be physically located together, but may comprise different instructions stored in different locations. When these instructions are logically combined together, they form the modules and achieve the prescribed purposes of the modules.

Actually, the executable code module may be a single instruction or a plurality of instructions, and can even be distributed at different code segments, in different programs, or across a plurality of memory devices. Also, operational data may be identified in the modules, implemented in any appropriate form, and organized in any data structure of an appropriate type. The operational data may be collected as a single data set, or distributed at different locations (including different memory devices), and may be at least partially present in a system or network merely as an electronic signal.

When the modules can be implemented by software, considering the current hardware level, a person skilled in the art can build a corresponding hardware circuit to achieve the corresponding function if taking no account of the cost. The hardware circuit comprises a conventional very-large-scale integration (VLSI) circuit, a gate array, an existing semiconductor such as a logic chip and a transistor, or other discrete components. The modules may further be implemented by a programmable hardware device, such as a field-programmable gate array, a programmable array logic device and a programmable logic device.

It should be appreciated that, the embodiments of the present disclosure may be implemented by hardware, software, firmware, middleware, microcode or a combination thereof. For the hardware implementation, the processor may include one or more of an ASIC, a DSP, a DSP device (DSPD), a Programmable Logic Device (PLD), an FPGA, a general-purpose processor, a controller, a microcontroller, a microprocessor, any other electronic unit capable of achieving the functions in the present disclosure, or a combination thereof.

For the software implementation, the scheme in the embodiments of the present disclosure may be implemented through modules capable of achieving the functions in the present disclosure (e.g., processes or functions). Software codes may be stored in the memory and executed by the processor. The memory may be implemented inside or outside the processor.

In addition, the functional units in the embodiments of the present disclosure may be integrated into a processing unit, or the functional units may exist independently, or two or more functional units may be combined together.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A positioning management method performed by a Next Generation-Radio Access Network (NG-RAN) node, wherein the NG-RAN node comprises a Local Location Management Function (LLMF), the positioning management method comprising:
    receiving a positioning request message from a core network node;
    performing positioning measurement in accordance with the positioning request message, so as to acquire a positioning measurement result; and
    acquiring position information about a target User Equipment (UE) in accordance with the positioning measurement result, and feeding the position information back to the core network node,
    the positioning management method further comprising:
    transmitting a first interface setup request message to the core network node; and receiving a first interface setup response message fed back by the network core node in accordance with the first interface setup request message,
    wherein the first interface setup request message is used to explicitly or implicitly indicate that the NG-RAN node comprises the LLMF.

2. The positioning management method according to claim 1, wherein the performing the positioning measurement in accordance with the positioning request message so as to acquire the positioning measurement result comprises:
    performing the positioning measurement using a target positioning algorithm in accordance with the positioning request message, so as to acquire the positioning measurement result.

3. The positioning management method according to claim 2, wherein the target positioning algorithm is determined in accordance with positioning capability information about the target UE.

4. The positioning management method according to claim 3, wherein the performing the positioning measurement using the target positioning algorithm so as to acquire the positioning measurement result comprises:
    transmitting a downlink positioning message to the target UE in accordance with the target positioning algorithm; and performing, by the target UE, the positioning measurement in accordance with the downlink positioning message, and feeding an uplink positioning message back to the NG-RAN node, the uplink positioning message comprising the positioning measurement result.

5. The positioning management method according to claim 4, wherein the performing, by the target UE, the positioning measurement in accordance with the downlink positioning message and feeding the uplink positioning message back to the NG-RAN node comprises:
    when the target UE has received the downlink positioning message in an idle state, triggering, by the target UE, a service establishment procedure, performing the positioning measurement in accordance with the downlink positioning message after a service has been established successfully, and feeding the uplink positioning message back to the NG-RAN node.

6. The positioning management method according to claim 2, wherein the target positioning algorithm is determined in accordance with positioning capability information about the target UE, positioning capability information about the NG-RAN node, and positioning capability information about a network element adjacent to the NG-RAN node,
    wherein the NG-RAN node and the network element adjacent to the NG-RAN node are both network elements participating in the positioning measurement.

7. The positioning management method according to claim 6, wherein the performing the positioning measurement using the target positioning algorithm so as to acquire the positioning measurement result comprises:
    transmitting a network positioning message to the network element adjacent to the NG-RAN node in accordance with the target positioning algorithm; and performing, by the network element adjacent to the NG-RAN node, the positioning measurement in accordance with the network positioning message, and feeding the positioning measurement result back to the NG-RAN node.

8. The positioning management method according to claim 1,
    wherein a first interface is an NG interface or S1 interface, the NG interface is a communication interface between an NG-RAN and a core network, and the S1 interface is a communication interface between a Long Term Evolution (LTE) eNodeB and an Evolved Packet Core (EPC).

9. The positioning management method according to claim 8, wherein when the first interface setup request message is used to indicate that the NG-RAN node comprises the LLMF, at least one of the following conditions is met:
    a condition where the first interface setup request message carries local location function indication information;
    a condition where the first interface setup request message carries identity information about the LLMF;
    a condition where the first interface setup request message carries Internet Protocol (IP) address information about the LLMF; and
    a condition where the first interface setup request message carries positioning capability information about the LLMF.

10. The positioning management method according to claim 8, wherein subsequent to transmitting the first interface setup request message to the core network node, the positioning management method further comprises:
    transmitting a predetermined configuration update message to the core network node; and
    receiving a predetermined configuration update acknowledgement message fed back by the core network node in accordance with the predetermined configuration update message,
    wherein the predetermined configuration update message carries positioning capability information about the LLMF, the predetermined configuration update message is an RAN configuration update message or a base station configuration update message, and the predetermined configuration update acknowledgement message is an RAN configuration update acknowledgement message or a base station configuration update acknowledgement message.

11. The positioning management method according to claim 9, wherein the positioning capability information about the LLMF comprises at least one of a positioning algorithm capable of being supported by the LLMF, accuracy of the LLMF, a positioning response time of the LLMF, and a maximum quantity of positioning capable of being supported by the LLMF.

12. A non-transitory computer-readable storage medium storing therein a computer program, wherein the computer program is executed by a processor so as to implement the steps of the positioning management method according to claim 1.

13. A positioning management method performed by a core network node, comprising:
transmitting a positioning request message to an NG-RAN node, wherein the NG-RAN node comprises a Local Location Management Function (LLMF); and
receiving position information about a target UE fed back by the NG-RAN node in accordance with the positioning request message,
the positioning management method further comprising:
receiving a first interface setup request message from the NG-RAN node, the first interface setup request message explicitly or implicitly indicating that the NG-RAN node comprises the LLMF; and
storing related information about the LLMF carried in the first interface setup request message, and feeding a first interface setup response message back to the NG-RAN node in accordance with the first interface setup request message.

14. The positioning management method according to claim 13,
wherein a first interface is an NG interface or S1 interface, the NG interface is a communication interface between an NG-RAN and a core network, and the S1 interface is a communication interface between an LTE eNodeB and an EPC.

15. The positioning management method according to claim 14, wherein subsequent to feeding the first interface setup response message back to the NG-RAN node, the positioning management method further comprises:
transmitting the related information about the LLMF to a Universal Data Management (UDM) for storage.

16. The positioning management method according to claim 14, wherein the related information about the LLMF at least comprises corresponding RAN identification information.

17. The positioning management method according to claim 14, wherein subsequent to receiving the first interface setup request message from the NG-RAN node, the positioning management method further comprises:
receiving a predetermined configuration update message from the NG-RAN node; and
storing the related information about the LLMF carried in the predetermined configuration update message, and feeding a predetermined configuration update acknowledgement message back to the NG-RAN node in accordance with the predetermined configuration update message,
wherein the predetermined configuration update message is an RAN configuration update message or a base station configuration update message, and the predetermined configuration update acknowledgement message is an RAN configuration update acknowledgement message or a base station configuration update acknowledgement message.

18. The positioning management method according to claim 17, wherein subsequent to feeding the predetermined configuration update acknowledgement message back to the NG-RAN node, the positioning management method further comprises:
transmitting the related information about the LLMF carried in the predetermined configuration update message to a UDM for storage.

19. A core network node, comprising a memory, a processor, a computer program stored in the memory and executed by the processor, and a transceiver or network interface, wherein the processor is configured to execute the computer program so as to implement the steps of the positioning management method according to claim 13.

20. A Next Generation-Radio Access Network (NG-RAN) node, comprising a memory, a processor, a computer program stored in the memory and executed by the processor, and a transceiver or a network interface, wherein the NG-RAN node comprises a Local Location Management Function (LLMF), wherein the processor is configured to execute the computer program so as to:
receive through the transceiver or network interface a positioning request message from a core network node;
perform positioning measurement in accordance with the positioning request message, so as to acquire a positioning measurement result; and
acquire position information about a target UE in accordance with the positioning measurement result, and feed the position information back to the core network node,
wherein the processor is further configured to execute the computer program so as to:
transmit a first interface setup request message to the core network node; and receive a first interface setup response message fed back by the network core node in accordance with the first interface setup request message,
wherein the first interface setup request message is used to explicitly or implicitly indicate that the NG-RAN node comprises the LLMF.

* * * * *